United States Patent [19]

Marek et al.

[11] Patent Number: 5,355,569
[45] Date of Patent: Oct. 18, 1994

[54] METHOD OF MAKING SENSOR

[75] Inventors: Jiri Marek, Reutlingen; Helmut Baumann, Gomaringen; Guenther Findler, Stuttgart; Michael Offenberg, Tuebingen; Martin Willmann, Reutlingen, all of Fed. Rep. of Germany

[73] Assignee: Robert Bosch GmbH, Stuttgart, Fed. Rep. of Germany

[21] Appl. No.: 951,169

[22] Filed: Sep. 25, 1992

[30] Foreign Application Priority Data

Sep. 27, 1991 [DE] Fed. Rep. of Germany ....... 4132232

[51] Int. Cl.⁵ .............................................. H01G 5/16
[52] U.S. Cl. .................................. 29/25.41; 29/25.42; 29/413; 29/414; 361/280
[58] Field of Search .................... 29/25.41, 25.42, 413, 29/414; 361/308, 321, 280

[56] References Cited

U.S. PATENT DOCUMENTS

| 3,431,473 | 3/1969 | Cormier et al. | 29/25.42 X |
| 3,466,513 | 9/1969 | Belko, Jr. et al. | 361/305 |
| 3,542,266 | 11/1970 | Woelfe | 29/413 X |
| 4,849,853 | 7/1989 | Rayburn | 29/25.42 X |
| 5,142,781 | 9/1992 | Mettner | 29/890.124 |

FOREIGN PATENT DOCUMENTS 0369352  5/1990  European Pat. Off. .

Primary Examiner—Carl E. Hall
Attorney, Agent, or Firm—Frishauf, Holtz, Goodman & Woodward

[57] ABSTRACT

A method for producing capacitive sensors which is used in particular for the parallel production of capacitive sensors with exactly defined stray capacitance. For this purpose, troughs (15, 16, 17) are cut along or parallel to the splitting lines (6), so that adjustment errors in the position of the cut, during separation of the sensors, and variations in the cut width have no effect on the stray capacitance.

10 Claims, 1 Drawing Sheet

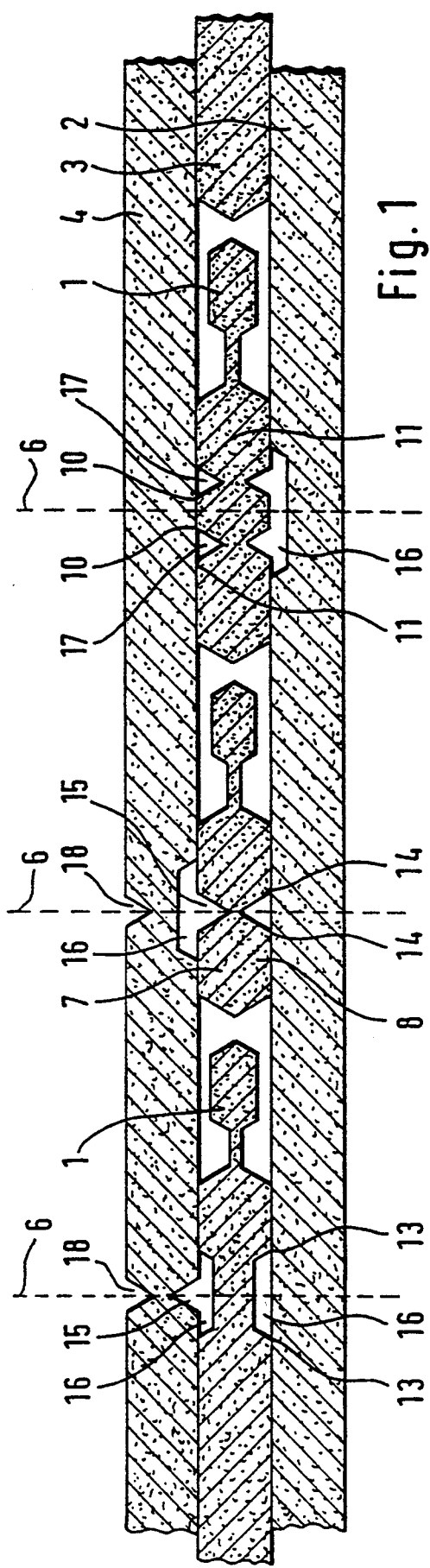
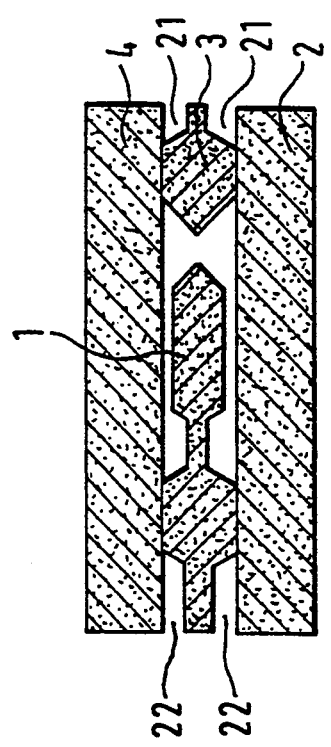
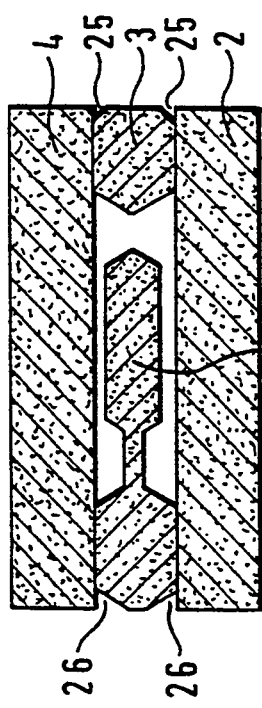

METHOD OF MAKING SENSOR

Cross-reference to related patents and applications, assigned to the assignee of the present invention, the disclosures of which are hereby incorporated by reference:

U.S. Pat. No. 4,955,234, MAREK, issued Sep. 11, 1990=DE 38 14 952;

U.S. Pat. No. 5,071,510 FINDLER & MUENZEL, issued Dec. 10, 1991, corresponding to German P 39 31 590.9 of Sep. 22, 1989 and German application P 40 02 472.0 of Feb. 6, 1990;

U.S. Ser. No. 07/631,623, MAREK, BANTIEN, HAACK & WARTH, corresponding to German Patent DE-PS 40 00 903 of Aug. 9, 1990;

U.S. Ser. No. 07/716,817, MAREK, filed Jun. 17, 1991, corresponding to German P 40 22 464.3, filed Jul, 14, 1990;

U.S. Ser. No. 07/566,997, METTNER et al., filed Aug. 13, 1990, and corresponding PCT/EP90/01297, publ. as WO 91-02169;

German Patent Disclosure DE 40 16 472.1 and corresponding U.S. Ser. No. 07/701,880, BANTIEN, filed May 17, 1991;

German Patent Disclosure DE 40 16 471.3 and corresponding U.S. Ser. No. 07/701,781, BANTIEN, filed May 17, 1991;

German Patent Application P 40 22 495.3, filed July 1990;

German Patent Disclosure DE 40 28 402.6 and corresponding U.S. Ser. No. 07/750,893, MAREK & SEIPLER, filed Aug. 26, 1991;

German Patent Disclosure DE 40 41 579.1 and corresponding allowed U.S. Ser. No. 07/800,491, METTNER, "MICROVALVE," filed Nov. 29 1991;

German Patent Disclosure DE 40 41 582.1 and corresponding U.S. Ser. No. 07/800,976, ROTHLEY, WOLF & ZABLER, filed Dec. 2, 1991;

German Patent Disclosure DE 41 06 932.3 and corresponding U.S. Ser. No. 07/840,328, WOLF & ZABLER, filed Feb. 24, 1992;

German Patent Disclosure DE 41 22 435.3 and corresponding U.S. Ser. No. 07/900,187 OFFENBERG et al., filed Jun. 17, 1992;

FIELD OF THE INVENTION

The present invention generally to production of sensors by processing of semiconductor wafers and, more particularly, to an improved method of mass-producing capacitive sensors, with precisely defined stray capacitance, from silicon wafers.

BACKGROUND

A method for producing capacitive acceleration sensors is known from from European Patent Disclosure EP 0 369 352, SUZUKI et al., published May 23, 1990 and corresponding U.S. Pat. No. 5,095,752, issued Mar. 17, 1992. There, a center plate consisting of monocrystalline silicon is connected with an upper and a bottom plate. The sensors are separated in that the three connected plates are cut with a laser beam or a saw. Because of inaccuracies during cutting, the sensors are not all the same, particularly with mass production, and have stray capacitances of various values, which distort or alter the measuring signals.

THE INVENTION

In contrast thereto, the method of the invention, utilizing troughs on or adjacent the splitting lines, has the advantage that the stray capacitance, which is connected parallel to the measuring capacitance, is exactly defined. A further advantage is that the requirement for adjustment and exactness of the cuts, during splitting, are reduced.

In connection with this, in a particularly advantageous manner the troughs are made on only one side or on both sides of the wafer or the plates, because in this way the processes required anyway for processing the wafer or the plates are utilized for making the troughs.

In an advantageous manner, the wafer and two additional plates consist of monocrystalline silicon and are connected by silicon-direct-bonding or by means of auxiliary layers by anodic bonding, gluing, welding or soldering, since the processes required for processing and connecting of silicon are well known. The manufacturing costs for the sensors are reduced by the parallel production of a plurality of sensors by means of wafer-plate connections.

Separation of the sensors by sawing is particularly cost-effective and simple, because sawing is well known from the semiconductor technology. During separation by laser beam, the sensors are only minimally contaminated. Troughs can be produced with great precision by the use of masking and etching processes. V-shaped troughs are particularly easy to produce, because their cross section in 100-silicon is scarcely affected by overetching. When using troughs with tub-shaped cross sections, particularly large tolerances of the cut width, as well as of the adjustment of the cut, are permissible.

By means of double troughs, the cross section of the troughs can be selected independently of the width of the cut and the danger of breaking during sawing is reduced.

The sensor in accordance with the invention has a well-defined size of the connecting surfaces between the wafer and the plates, which is independent of adjustment errors during splitting or of variations of the cut width. In this way, the stray capacitance of the sensors is exactly defined and can be taken into consideration during evaluation of the sensor signals.

Thus, the sensor of the invention has a known and easily reproducible stray capacitance.

DRAWINGS

FIG. 1 shows three sensors prior to separation, and

FIGS. 2 and 3 each show a sensor in accordance with the invention.

DETAILED DESCRIPTION

A monocrystalline sensor has been designated by 3 in FIG. 1, and movable sensor elements 1 have been structured out of it. The sensor 3 is connected with plates 2 and 4, which are capable of conducting and are insulated in respect to the wafer 3. Silicon, gallium arsenide and quartz are suitable as materials for the crystalline wafer 3. The plates 2, 4 are made, for example, of silicon, gallium arsenide, quartz or glass. Processing of the wafer 3 is practically performed by masking and etching techniques. Anisotropic etching techniques, such as are known for monocrystalline materials, are used in a particularly advantageous manner. The plates 2 and 4 are also processed by means of masking and etching techniques. Suitable techniques are disclosed in the patents and applications referenced at the beginning of the present specification.

The conductivity of the wafer 3 or the plates 2, 4 can also be attained by applying thin, conductive coatings. Connection of the wafer 3 with the plates 2 and 4 is made by silicon direct-bonding, anodic bonding, gluing, welding or soldering.

A plurality of sensors is produced in parallel by the connection of the wafer 3 with the plates 2 and/or 4. Three sensors have been shown by way of example in FIG. 1. To obtain individual sensors, the plates 2 and 4 and the wafer 3 are split by cuts along the splitting lines 6. These cuts are made by sawing or material removal by means of a laser beam. Trenches or troughs 15, 16, 17 are provided on or next to the splitting lines 6. In this connection, it is possible to use different cross sections, such as V-shaped trenches 15, tub-shaped 16 or double troughs 17, in this case in the form of double V troughs.

The signal of the sensors is obtained by measuring a capacitance change of the movable sensor element or seismic mass 1 in relation to the plates 2, 4. There is stray capacitance parallel to the sensor capacitance. The size of this stray capacitance is essentially caused by the size of the connecting surface between the wafer 3 and the plates 2 and 4. Without the troughs 15, 16, 17 which have been cut in, the size of this contact surface would vary considerably, from sensor to sensor, because of the adjusting inaccuracies of the cuts and because of variations in the cut width. Thus, the exact definition of the stray capacitance is achieved by means of the troughs.

The V-shaped troughs 15, for example, are particularly simple to make in silicon. The tub-shaped troughs 16 can also be used for wider cuts and in case of greater adjustment inaccuracies during splitting. Double trough structures, for example double V-shaped troughs 17, can be used for wide cuts with relatively small adjustment inaccuracies. The double trough structures are also advantageous for simplifying splitting by sawing, because they tolerate the forces occurring during sawing better and, in this way, the danger of breaking is less. This is also true for parallel, tub-shaped troughs. The troughs can be cut in the wafer 3 as well as in the sides of the plates 2 and/or 4 facing the wafer. The trenches or troughs 18, also shown in FIG. 1 on the outwardly oriented side of the plates 2, 4, are only used for checking the adjustment during splitting, and have no effect on the definition of the stray capacitance.

FIG. 2 shows a sensor with a movable sensor element 1, which has been structured out of a wafer 3 and has been provided with two plates 2 and 4. Recesses 25, 26 can be seen in the edge areas. These recesses 25, 26 have been generated by splitting a V-shaped trough. In FIG. 2 the recess 25 is a little smaller than the recess 26. The cause of this difference is an adjustment inaccuracy during separation of the sensor, but has not effect on the value of the stray capacitance. The recesses shown here can also be generated by cutting a double V trough.

In FIG. 3, a sensor with a movable sensor element 1 is shown, which has been structured out of a wafer 3 and has been provided with plates 2 and 4. The sensor has been provided with recesses 21 and 22 in the edge areas. In this figure, too, the adjustment inaccuracy in the course of separating the sensors has been indicated by the different size of the recesses 21 and 22. The recesses 21 and 22 were generated in the course of splitting a tub-shaped trough.

It is attained by means of the recesses 21, 22, 25, 26 that, regardless of the cutting accuracy and/or cut width, the connecting surface between the wafer 3 and the plates 2, 4 always remains the same. Since the stray capacitance, which is superimposed on the useful or service capacitance, is essentially determined by the connecting surface, the interfering stray capacitance is always the same when using the method of the invention, even with mass production of the sensors, so that production losses are greatly reduced.

Various changes and modifications may be made, and features described in connection with any one of the embodiments may be used with any of the others, within the scope of the inventive concept.

We claim:

1. A method for producing a capacitive sensor adapted for measurement of at least one of acceleration, inclination, and rate of rotation, where said sensor is made from a monocrystalline wafer (3), which is conductive at least on its surface, and which is connected with at least one plate (2,4) which is conductive at least on its surface, where the wafer (3) and the plate (2, 4) are insulated against each other and joined to form a composite;

comprising the steps of forming a plurality of parallel troughs (15, 16, 17) on a plate-facing major surface of said wafer (3) and on a wafer-facing major surface of said each plate (2, 4); and splitting said composite along splitting line (6) in selected ones of said parallel troughs, thereby precisely defining values of stray capacitance in said sensor.

2. A method in accordance with claim 1, characterized in that
the troughs (15, 16, 17) are cut in the underside (8) and/or the top (7) of the wafer (3) or in the side of the plate (2, 4) facing the wafer (3).

3. A method in accordance with claim 1, characterized in that
the wafer (3) and the two plates (2, 4) are of monocrystalline silicon, that the wafer (3) is located between the two plates (2, 4) and that the connection between the plates (2, 4) and the wafer (3) is made by at least one of silicon-direct-bonding, anodic bonding, gluing, welding and soldering.

4. A method in accordance with claim 1, characterized in that
a plurality of sensors is manufactured in parallel.

5. A method in accordance with claim 1, characterized in that
splitting is performed by sawing.

6. A method in accordance with claim 1, characterized in that
splitting is performed by means of a laser beam.

7. A method in accordance with claim 1, characterized in that
the troughs (15, 16, 17) are generated by masking and etching processes.

8. A method in accordance with claim 1, characterized in that
the troughs (15) have a V-shaped profile and the distance of the edges (14) is greater than the sum of the maximum cut width and adjustment inaccuracy during splitting.

9. A method in accordance with claim 1, characterized in that the troughs (16) have a tub-shaped profile and the distance of the edges (13) is greater than the sum Of the maximum cut width and adjustment inaccuracy during splitting.

10. A method in accordance with claim 1, characterized in that
the splitting lines (6) are located between two parallel troughs (17), that the distance between the inner edges (10) of the troughs is less than the minimum cut width, and that the width of the outer edges (11) of the troughs is greater than the sum of the maximum cut width and adjustment inaccuracy during splitting.

* * * * *